United States Patent
Bohac, Jr.

(10) Patent No.: US 9,064,194 B1
(45) Date of Patent: Jun. 23, 2015

(54) SYSTEMS AND METHODS FOR SPIKE SUPPRESSION FOR DYNAMIC MAGNETIC STRIPE COMMUNICATIONS DEVICES

(71) Applicant: Frank J. Bohac, Jr., Tustin, CA (US)

(72) Inventor: Frank J. Bohac, Jr., Tustin, CA (US)

(73) Assignee: DYNAMICS INC., Pittsburgh, PA (US)

( * ) Notice: Subject to any disclaimer, the term of this patent is extended or adjusted under 35 U.S.C. 154(b) by 68 days.

(21) Appl. No.: 13/756,852

(22) Filed: Feb. 1, 2013

Related U.S. Application Data (60) Provisional application No. 61/594,721, filed on Feb. 3, 2012.

(51) Int. Cl.
*G06K 19/06* (2006.01)

(52) U.S. Cl.
CPC .............................. *G06K 19/06206* (2013.01)

(58) Field of Classification Search
CPC ........... H01L 2924/3025; G06K 7/084; G06K 7/082; G06F 17/5054; G06F 17/5072; G11B 20/10009; G11B 2220/2516; G11B 5/00808; G11B 5/012; G11B 5/10; G11B 5/11; G11B 5/596
USPC .................. 235/375, 380, 492, 493, 486, 487
See application file for complete search history.

(56) References Cited

U.S. PATENT DOCUMENTS

| | | | | |
|---|---|---|---|---|
| 8,579,203 | B1 * | 11/2013 | Lambeth et al. | 235/492 |
| 8,602,312 | B2 | 12/2013 | Cloutier et al. | |
| 2014/0107486 | A1 * | 4/2014 | Kaplan et al. | 600/459 |

\* cited by examiner

*Primary Examiner* — Thien M Le

(57) ABSTRACT

Dynamic magnetic stripe communications devices are provided as magnetic stripe emulators on a card or device having one or more communication channels. An application specific integrated circuit (ASIC) may include one or more waveform generators that include spike suppression circuitry to reduce excessive signal excursions during power-up and/or activation of the one or more communication channels on the card or device. Data to be communicated by the magnetic stripe emulator may be encoded within the one or more waveforms and communicated to a magnetic stripe reader.

18 Claims, 6 Drawing Sheets

SYSTEMS AND METHODS FOR SPIKE SUPPRESSION FOR DYNAMIC MAGNETIC STRIPE COMMUNICATIONS DEVICES

CROSS-REFERENCE TO RELATED APPLICATION

This application claims the benefit of U.S. Provisional Patent Application No. 61/594,721, titled "SYSTEMS AND METHODS FOR SPIKE SUPPRESSION FOR DYNAMIC MAGNETIC STRIPE COMMUNICATIONS DEVICES," filed Feb. 3, 2012, which is hereby incorporated by reference herein in its entirety.

BACKGROUND OF THE INVENTION

This invention relates to powered cards and devices and related systems.

SUMMARY OF THE INVENTION

A card may include a dynamic magnetic communications device, which may take the form of a magnetic encoder or a magnetic emulator. A magnetic encoder, for example, may be utilized to modify information that is located on a magnetic medium, such that a magnetic stripe reader may then be utilized to read the modified magnetic information from the magnetic medium. A magnetic emulator, for example, may be provided to generate electromagnetic fields that directly communicate data to a read-head of a magnetic stripe reader. A magnetic emulator, for example, may communicate data serially to a read-head of the magnetic stripe reader. A magnetic emulator, for example, may communicate data in parallel to a read-head of the magnetic stripe reader. A magnetic emulator, for example, may generate one or more waveforms using one or more signal generators to communicate data via one or more communication channels to a read-head of the magnetic stripe reader.

All, or substantially all, of the front surface, as well as the rear surface, of a card may be implemented as a display (e.g., bi-stable, non bi-stable, LCD, or electrochromic display). Electrodes of a display may be coupled to one or more touch sensors, such that a display may be sensitive to touch (e.g., using a finger or a pointing device) and may be further sensitive to a location of the touch. The display may be sensitive, for example, to objects that come within a proximity of the display without actually touching the display.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a merchant code or incentive code. The code may be received by the card via manual input (e.g., onto buttons of the card) or via a wireless transmission (e.g., via light, electromagnetic communications, sound, or other wireless signals). A code may be communicated from a webpage (e.g., via light and/or sound). A card may include a display such that a received code may be visually displayed to a user. In doing so, the user may be provided with a way to select, and use, the code.

A dynamic magnetic stripe communications device may include a magnetic emulator that comprises one or more inductors (e.g., one or more coils). Current may be provided through these coils to create electromagnetic fields that may be operable to communicate with the read-head of a magnetic stripe reader. One or more signal generators (e.g., one or more ramp generators and one or more signal shaping generators) may combine to generate one or more signals to fluctuate the amount of current traveling through the one or more coils. In so doing, one or more electromagnetic waveforms generated by the one or more coils may communicate one or more tracks of magnetic stripe data to a read-head of a magnetic stripe reader.

An application specific integrated circuit (ASIC) may, for example, comprise one or more signal generators to generate one or more signals to one or more coils of a card or device. The one or more signals may, for example, be amplified and filtered within the ASIC before being provided to the one or more coils of a magnetic emulator.

Accordingly, for example, a processor of a card may receive manual input (e.g., a button press) from a user of a card to retrieve information (e.g., payment account information) from a memory of the card, where the information may be associated with the feature selected by the button press. The processor may, for example, communicate with an ASIC on the card to cause the information to be frequency/double frequency (F2F) encoded within a signal generated by the ASIC. The signal may be converted to a different format (e.g., converted from a voltage to a current signal) and applied to a coil of a magnetic emulator so that the information may be communicated to a read-head of a magnetic stripe reader via a magnetic waveform generated by the coil. Multiple signals may be applied to multiple coils of a magnetic emulator by the ASIC to generate multiple magnetic waveforms of information.

An ASIC (or other circuitry within a card) may be utilized to suppress the generation of spurious signals while the card is being activated for use. For example, power-up circuitry may be utilized to allow time for various components (e.g., amplifiers) within the card to stabilize before processing signals and/or data from within the card. In so doing, for example, a power-up detector may be used to detect an operational signal (e.g., an operational voltage signal) within the card, so that the operational signal may be known to have achieved an acceptable amplitude. Accordingly, for example, an input and/or an output of one or more components (e.g., an output of an amplifier) may be disabled (e.g., clamped to a particular voltage level) until operational voltage within the card has achieved an acceptable magnitude.

A dynamic magnetic stripe communications device may communicate multiple channels of information (e.g., first, second, and third tracks of magnetic stripe data) to a magnetic stripe reader. A dynamic magnetic stripe communications device may communicate first, second, and third tracks of magnetic stripe data simultaneously. A dynamic magnetic stripe communications device may communicate first, second, and/or third tracks of magnetic stripe data one at a time.

An ASIC (or other circuitry within a card) may be utilized to suppress spurious signals (e.g., spurious current signals) while one or more channels of a dynamic magnetic stripe communications device are being activated for use. For example, a dynamic magnetic stripe communications device may include a magnetic emulator that comprises an inductor (e.g., a coil) that conducts no current while its associated communication channel is muted (e.g., deactivated). Once the communication channel is no longer muted (e.g., activated), current may be provided through the coil to create a magnetic field operable to communicate with the read-head of a magnetic stripe reader. A ramp circuit may, for example, be used to control an initial slew rate of a current signal conducted by the coil. Accordingly, for example, a signal spike (e.g., a current signal spike generated within a communication channel of a dynamic magnetic stripe communications device of a card or device) may be suppressed by the slew rate control of the current signal. In so doing, for example, any spurious communications that may be received by a magnetic stripe reader as a result of such a current signal spike may be suppressed.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
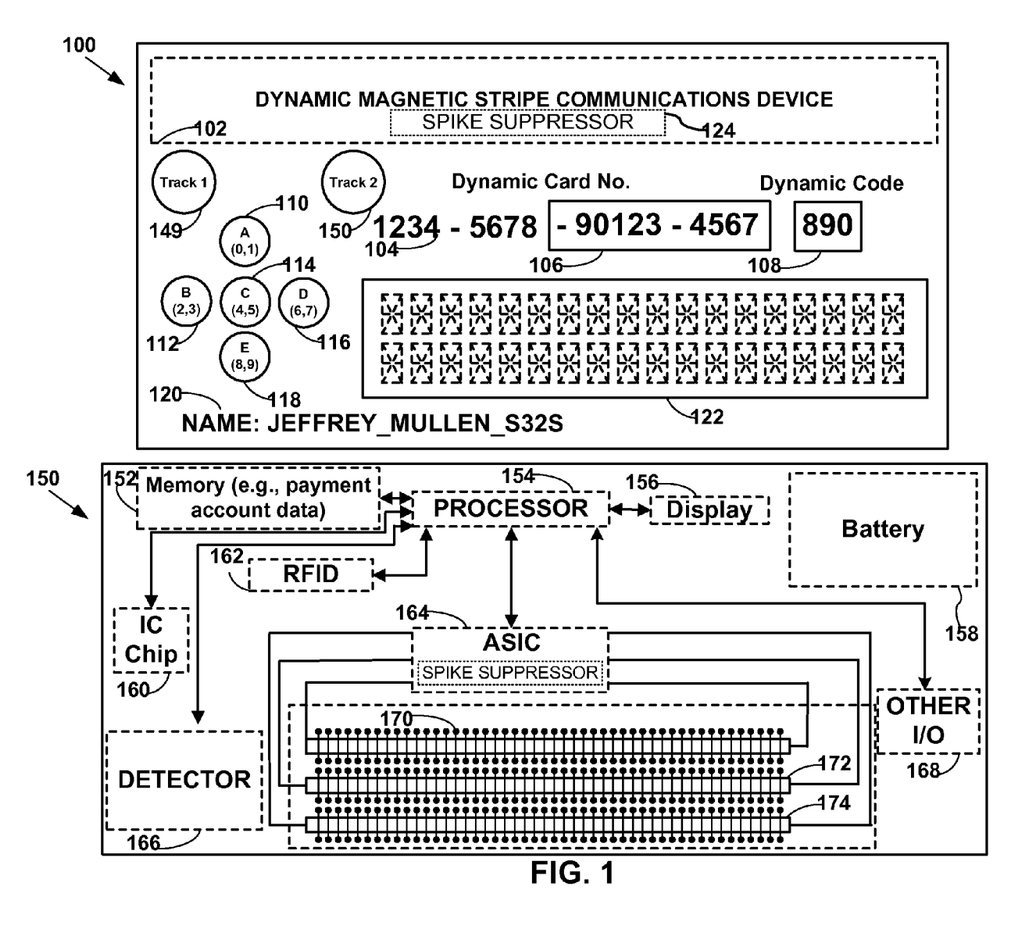
FIG. 1 is an illustration of a card constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may be entirely, or partially, displayed via a second display (e.g., display 108). Display 108 may be utilized, for example, to display a dynamic code such as a dynamic security code. Card 100 may also include third display 122 that may be used to display graphical information, such as logos and barcodes. Third display 122 may also be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electrochromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may then be determined and processed by a processor of card 100 as data input.

For example, one or more buttons 110-118 may be activated in response to indicia displayed on a display (e.g., display 122) that may be associated with corresponding information (e.g., payment account information) that may be stored within a memory of card 100. Alternately, for example, a single button (e.g., button 110) may be pressed multiple times to sequentially display data that may be associated with information (e.g., information associated with multiple payment accounts).

Card 100 may include button 149. Button 149 may be used, for example, to communicate a magnetic waveform via dynamic magnetic stripe communications device 102 indicative of a user's desire to communicate a single track of magnetic stripe information. Persons skilled in the art will appreciate that pressing a button (e.g., button 149) may activate dynamic magnetic stripe communications device 102 and may cause information to be communicated via dynamic magnetic stripe communications device 102 when an associated read-head detector detects the presence of a read-head of a magnetic stripe reader.

Button 150 may be utilized to communicate (e.g., after button 150 is pressed and after a read-head detects a read-head of a reader) information indicative of a user selection (e.g., to communicate two tracks of magnetic stripe data). For example, data associated with a user's payment account may be extracted from a memory location within card 100 and may be converted to an analog waveform (e.g., an F2F encoded waveform). In so doing, a waveform representative of two tracks of magnetic stripe information may be communicated to a read head of a magnetic stripe reader.

Persons skilled in the art will appreciate that a physical payment card may be provided as a virtual payment card on a display of any device, such as a mobile telephonic device or personal computing device. A button on a physical payment card may be a button on any device, such as a mobile telephonic device or personal computing device. Accordingly, for example, a device (e.g., a cell phone) may receive manual input from a manual user interface (e.g., a virtual button on a capacitive touch screen) and communicate information indicative of the selection (e.g., a single track of magnetic stripe data) to another device (e.g., a payment terminal such as a card reader) via a communications device (e.g., an RF-based communications device).

FIG. 1 shows architecture 150, which may include one or more processors 154 and one or more ASICs 164. Processor 154 and ASIC 164 may be configured to utilize external memory 152, internal memory to processor 154 and/or ASIC 164, or a combination of external memory and internal memory for dynamically storing information, such as executable machine language, related dynamic machine data, user input data values, or any other type of information (e.g., payment account data).

ASIC 164 may, for example, retrieve data stored within memory 152. ASIC 164 may, for example, include one or more signal generators (e.g., ramp generators and signal shaping generators) that may receive the data and may convert the data to one or more signals (e.g., one or more current signals). One or more of the current signals may be used to drive one or more electromagnetic field generators 170-174 to generate one or more electromagnetic signals that may be received by a magnetic stripe reader.

ASIC 164 may, for example, include spike suppression circuitry (e.g., spike suppressor 124 of FIG. 1). Such spike suppression circuitry may, for example, be used to suppress spurious signals that may be generated within electromagnetic generators 170-174 during power-up events or communication channel activation events of a card or device (e.g., card 100 of FIG. 1). In so doing, for example, electromagnetic signals generated by such spurious signals may be suppressed so as to avoid inadvertent detection by a magnetic stripe reader.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes. The data to be displayed on the display may be displayed on one or more displays 156.

One or more displays 156 may be, for example, touch sensitive and/or proximity sensitive. For example, objects such as fingers, pointing devices, etc., may be brought into contact with displays 156, or into proximity with displays 156. Detection of object proximity or object contact with displays 156 may be effective to perform any type of function (e.g., transmit data to processor 154). Displays 156 may have multiple locations that are able to be determined as being touched, or determined as being in proximity to an object.

Input and/or output devices may be implemented on architecture 150. For example, integrated circuit (IC) chip 160 (e.g., an EMV chip) may be included within architecture 150, that may communicate information to a chip reader (e.g., an EMV chip reader). Radio frequency identification (RFID) module 162 may be included within architecture 150 to enable the exchange of information between an RFID reader/writer and a card (e.g., card 100 of FIG. 1).

Other input and/or output devices 168 may be included within architecture 150, for example, to provide any number of input and/or output capabilities on a card (e.g., card 100 of FIG. 1). For example, other input and/or output devices 168 may include an audio device capable of receiving and/or transmitting audible information. Other input and/or output devices 168 may include a Wi-Fi device, such that a card (e.g., card 100 of FIG. 1) may access an open network (e.g., the Internet).

Other input and/or output devices 168 may include a device that exchanges analog and/or digital data using a visible data carrier. For example, light pulses may be received by other input and/or output devices 168 and may be construed by processor 154 as data indicative of information that may be stored in memory (e.g., payment account data stored within memory 152). Other input and/or output devices 168 may include a device, for example, that is sensitive to a non-visible data carrier, such as an infrared data carrier or electromagnetic data carrier.

Persons skilled in the art will appreciate that a card (e.g. card 100 of FIG. 1) may, for example, be a self-contained device that derives its own operational power from one or more batteries 158. Furthermore, one or more batteries 158 may be included, for example, to provide operational power to a card for a period of time (e.g., a period between 2 and 5 years such as approximately 2 years). One or more batteries 158 may be included, for example, as rechargeable batteries.

A dynamic magnetic stripe communications device may be included on a card (e.g., card 100 of FIG. 1) to communicate information to, for example, a read-head of a magnetic stripe reader via, for example, electromagnetic signals. For example, electromagnetic field generators 170-174 may be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a magnetic material and/or a non-magnetic material). Additional materials may be placed outside the coil (e.g., a magnetic material and/or a non-magnetic material).

Electrical excitation by ASIC 164 of one or more coils of one or more electromagnetic field generators 170-174 may be effective to generate one or more electromagnetic waveforms. The one or more electromagnetic waveforms may be utilized to communicate information from a card (e.g., card 100 of FIG. 1) to one or more read-heads of a magnetic stripe reader.

Timing aspects of information exchange between a card and the various input and/or output devices implemented on the card may be determined by a processor of the card. Detector 166 may be utilized, for example, to sense the proximity and/or actual contact, of an external device, which in turn, may trigger the initiation of a communication sequence. The sensed presence and/or touch of the external device may then be communicated to a controller (e.g., processor 154 and/or ASIC 164), which in turn may direct the exchange of information between a card (e.g., card 100 of FIG. 1) and the external device. The sensed presence and/or touch of the external device may be effective to, for example, determine the type of device or object detected.

For example, the detection may include the detection of, for example, a read-head of a magnetic stripe reader. In response, ASIC 164 may activate one or more electromagnetic field generators 170-174 to initiate a communications sequence with, for example, one or more read-heads of a magnetic stripe reader. ASIC 164 may, for example, control the slew rate of a signal (e.g., a current signal) upon activation of electromagnetic field generators 170-174. In so doing, the communication characteristics between one or more electromagnetic field generators 170-174 and one or more read-heads of a magnetic stripe reader may be controlled.

Detector 166 may, for example, detect a direction and velocity of movement of a read-head of a magnetic stripe reader and report such detected direction and velocity to processor 154. Processor 154 may, in turn, report the direction and velocity of movement to ASIC 164, which may in turn generate one or more magnetic waveforms that are compatible with the detected direction and velocity of movement of the detected read-head of the magnetic stripe reader.

Persons skilled in the art will appreciate that processor 154 and/or ASIC 164 may provide user-specific and/or card-specific information through utilization of any one or more buttons (e.g., buttons 110-118 of card 100 of FIG. 1), RFID 162, IC chip 160, electromagnetic field generators 170-174, and other input and/or output devices 168.

Figure 2:
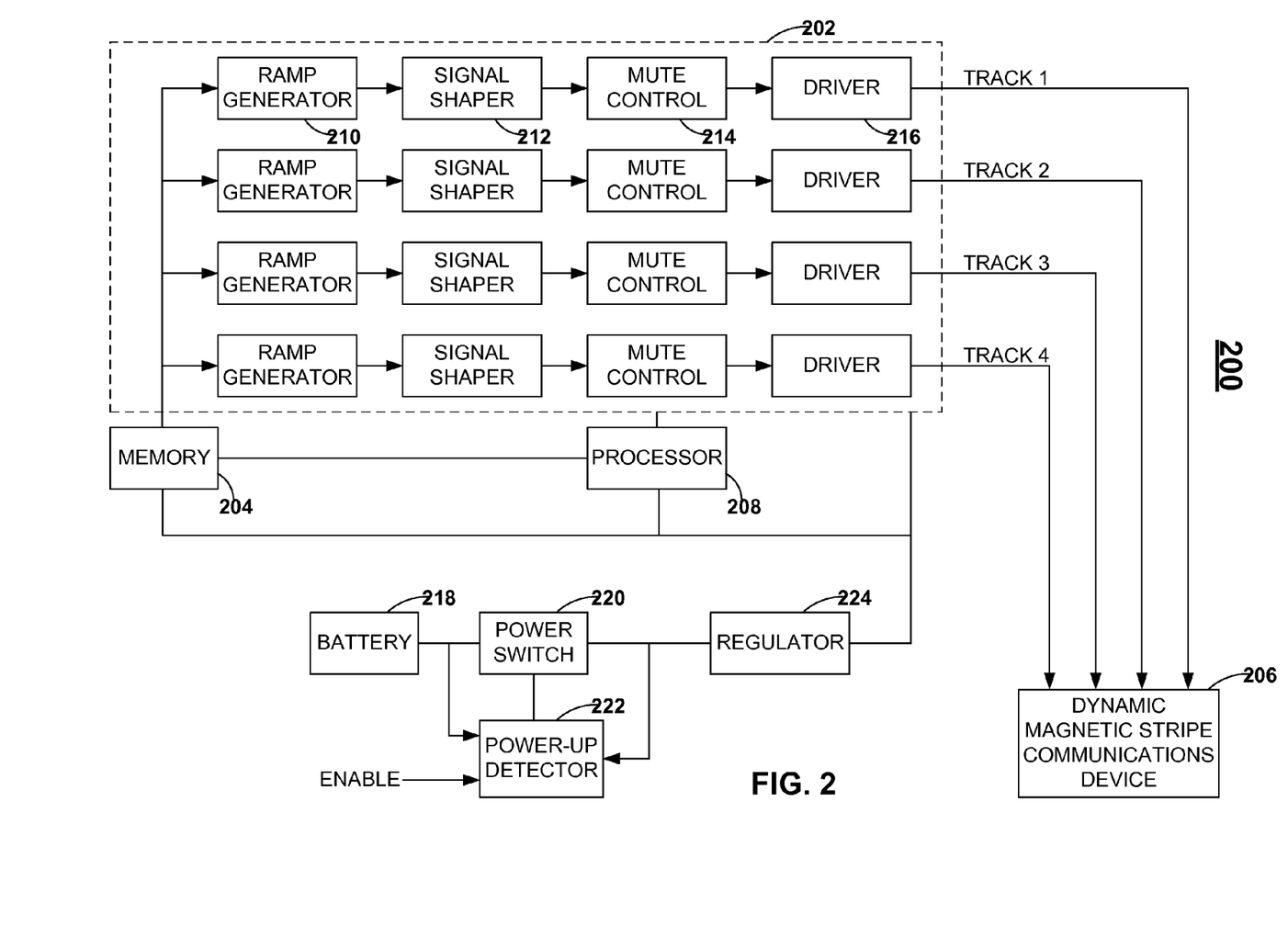
FIG. 2 is an illustration of a card constructed in accordance with the principles of the present invention.

FIG. 2 shows card 200, which may include ASIC 202, memory 204, dynamic magnetic stripe communications device 206, processor 208, battery 218, power switch 220, regulator 224, and slew-rate limiter/power-up detector 222. ASIC 202 may include, for example, ramp generator 210, signal shaper 212, mute control 214, and/or driver 216. ASIC 202 may, for example, include ramp generators, signal shapers, mute controls, and drivers for each channel (e.g., TRACK 1, TRACK 2, TRACK 3, and TRACK 4) of magnetic stripe data that may be provided to dynamic magnetic stripe communications device 206 for communication to a magnetic stripe reader.

Memory 204 may, for example, contain data (e.g., payment account data) that may be retrieved based on input (e.g., a button press) to card 200. Payment account data associated with the button press may be retrieved from memory 204 and may be provided to any one or more ramp generators (e.g., ramp generator 210) of ASIC 202.

A control signal may be generated, for example, by processor 208 or other control circuitry. Such a control signal may be utilized by ramp generator 210 to, for example, generate a linearly increasing or a linearly decreasing signal. The slope of the signal may be pre-determined and stored in memory 204. The slope of the signal may be changed. For example, the slope of the signal may be different depending on, for example, the environment that is sensed by card 200 or other device (e.g., a determination by a read-head detector that a particular type of reader is being utilized). The signal produced by ramp generator 210 may also be controlled to produce frequency/double-frequency (F2F) encoded information. The F2F encoding may, for example, be based on data (e.g., payment account data) retrieved from memory 204.

The signal produced by ramp generator 210 may, for example, be limited to a maximum positive amplitude for positive excursions of the ramp signal. The signal produced by ramp generator 210 may, for example, be limited to a maximum negative amplitude for negative excursions of the ramp signal. The maximum positive amplitude and the maximum negative amplitude may, for example, be variable and may be controlled by processor 208 in accordance with threshold values stored in memory 204. One or more signal shapers (e.g., signal shaper 212) may be utilized to shape the signal produced by ramp generator 210 to provide, for example, a non-linear shape (e.g., a sinusoidal shape) in the signal.

One or more mute controls (e.g., mute control 214) may, for example, control a magnitude of a signal (e.g., a current signal) that may be delivered to dynamic magnetic stripe communications device 206 by driver 216. Mute control 214 may, for example, control an amount of time required to deliver a current signal (e.g., a minimum amplitude current signal) to dynamic magnetic stripe communications device 206 once dynamic magnetic stripe communications device 206 is activated for communication (e.g., when a read head of a magnetic stripe reader has been detected by processor 208).

Mute control 214 may, for example, provide a control signal to an output of signal shaper 212 to slowly increase an amount of current provided to dynamic magnetic stripe communications device 206 after being activated for use. For example, current provided to a first channel (e.g., Track 1) of dynamic magnetic stripe communications device 206 may increase from no current to a current magnitude between approximately 1 mA and 5 mA (e.g., approximately 3 mA). Increasing this current magnitude too quickly may, for example, induce an electromagnetic spike within a magnetic stripe reader that may be in communication with dynamic magnetic stripe communications device 206.

Accordingly, for example, a mute ramp circuit (not shown) within mute control 214 may provide a control signal to an output of signal shaper 212 to slowly increase the current magnitude from 0 mA to a minimum amplitude current signal (e.g., approximately 3 mA) within approximately between 30 and 50 usec (e.g., approximately 40 usec) to ready a first channel of dynamic magnetic stripe communications device 206 for communication. Driver 216 may, for example, convert a signal (e.g., a voltage signal generated by signal shaper 212) to a different signal (e.g., a current signal) that may be provided to dynamic magnetic stripe communications device 206.

During a period after card 200 is activated for use (e.g., at power-up of card 200), circuitry (e.g., internal bias circuits of driver 216) may not be stabilized. Accordingly, for example, power-up detector 222 may deactivate driver 216 until such time that the internal bias circuits of driver 216 have had time to stabilize once card 200 is activated for use.

Figure 3:
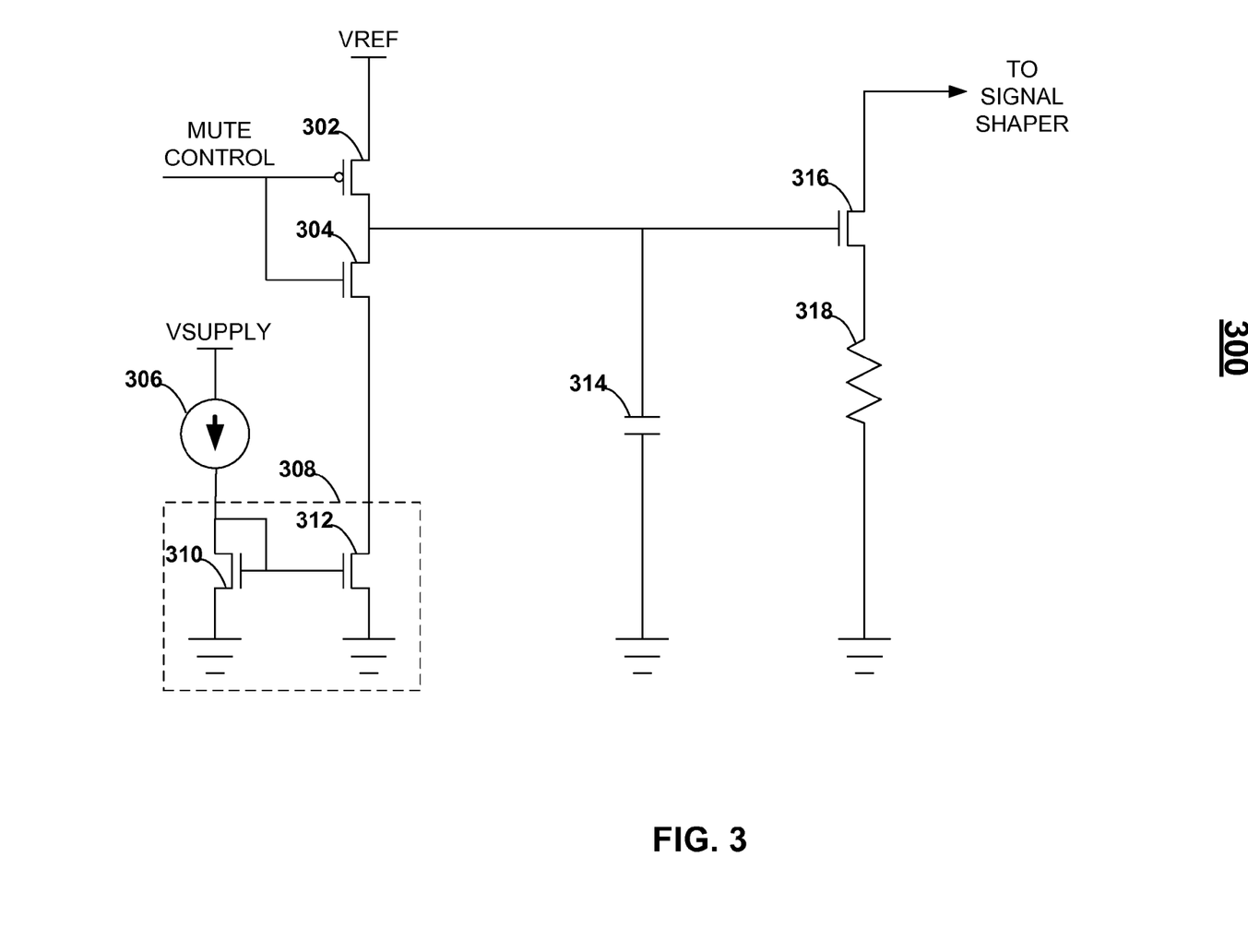
FIG. 3 is an illustration of a spike suppression circuit constructed in accordance with the principles of the present invention.

FIG. 3 shows mute ramp circuit 300 which may include P-FET 302, N-FET 304, current source 306, current mirror 308, capacitor 314, resistor 318, and N-FET 316. Signal MUTE CONTROL may activate and may deactivate a dynamic magnetic stripe communications device (e.g., TRACK 1 of dynamic magnetic stripe communications device 206 of FIG. 2) for use. When signal MUTE CONTROL transitions to a logic low level, for example, the output of a signal shaper (e.g., signal shaper 212 of FIG. 2) may be pulled to a logic low level, which may prohibit any current from being conducted by a dynamic magnetic stripe communications device (e.g., TRACK 1 of dynamic magnetic stripe communications device 206 of FIG. 2). When signal MUTE CONTROL is at a logic high level, for example, the output of a signal shaper (e.g., signal shaper 212 of FIG. 2) may be slowly activated, which may slowly increase an amount of current that may be conducted by the dynamic magnetic stripe communications device.

In operation, a dynamic magnetic stripe communications device is muted (e.g., deactivated for use) when signal MUTE CONTROL is at a logic low level. Accordingly, for example, transistor 302 may be conductive, which may charge capacitor 314 to a nominal voltage magnitude (e.g., VREF). The voltage magnitude of VREF may be between approximately 1.2 and 1.3 volts (e.g., approximately 1.25 volts). In so doing, a transconductance amplifier (e.g., transistor 316 and resistor 318) may be conductive, which may pull a voltage output of a signal shaper (e.g., signal shaper 212 of FIG. 2) approximately between 70 mV and 90 mV (e.g., approximately 80 mV) below a nominal output voltage level. The voltage offset may, for example, cause an amount of current conducted by a dynamic magnetic stripe communications device (e.g., TRACK 1 of dynamic magnetic stripe communications device 206 of FIG. 2) to be substantially equal to zero.

A dynamic magnetic stripe communications device may be unmuted (e.g., activated for use) when signal MUTE CONTROL is at a logic high level. Accordingly, for example, transistor 304 may be conductive to allow capacitor 314 to discharge through transistor 312 of current mirror 308. In so doing, transistor 312 may conduct a magnitude of current that is in ratio proportion to a magnitude of current conducted by transistor 310. Geometric dimensions of transistor 312 may, for example, be between approximately ¼th and ⅛th (e.g., approximately ⅙th) of the geometric dimensions of transistor 310. Accordingly, for example, a magnitude of current conducted by transistor 312 may be equal to between approximately ¼th and ⅛th (e.g., approximately ⅙th) of the magnitude of current conducted by transistor 310. In so doing, for example, the current magnitude conducted by transistor 310 may be approximately between 500 nA and 700 nA (e.g., approximately 600 nA) and the current magnitude conducted by transistor 312 may be approximately between 500/6 nA and 700/6 nA (e.g., approximately 600/6 nA or 100 nA).

As capacitor 314 discharges through transistor 312 of current mirror 308, the voltage across capacitor 314 may slowly decrease (e.g., the voltage across capacitor 314 may discharge to ground at a rate of approximately 10 mV/usec). As the voltage across capacitor 314 decreases, the conductivity state of transistor 316 may transition from a conductive state to a non-conductive state. Once the voltage across capacitor 314 decreases to the threshold voltage of transistor 316, which may be approximately between 0.7 volts and 0.8 volts (e.g., approximately 0.75 volts), transistor 316 may become substantially non-conductive.

Accordingly, for example, the output of a signal shaper (e.g., signal shaper 212 of FIG. 2) may become active. In so doing, for example, a delay between approximately 40 usec and 60 usec (e.g., approximately 50 usec) may exist from the time a dynamic magnetic stripe communications device may be unmuted (e.g., activated for use) until the time the dynamic magnetic stripe communications device (e.g., TRACK 1 of dynamic magnetic stripe communications device 206 of FIG. 2) may conduct a minimum current signal (e.g., approximately 3 mA).

Figure 4:
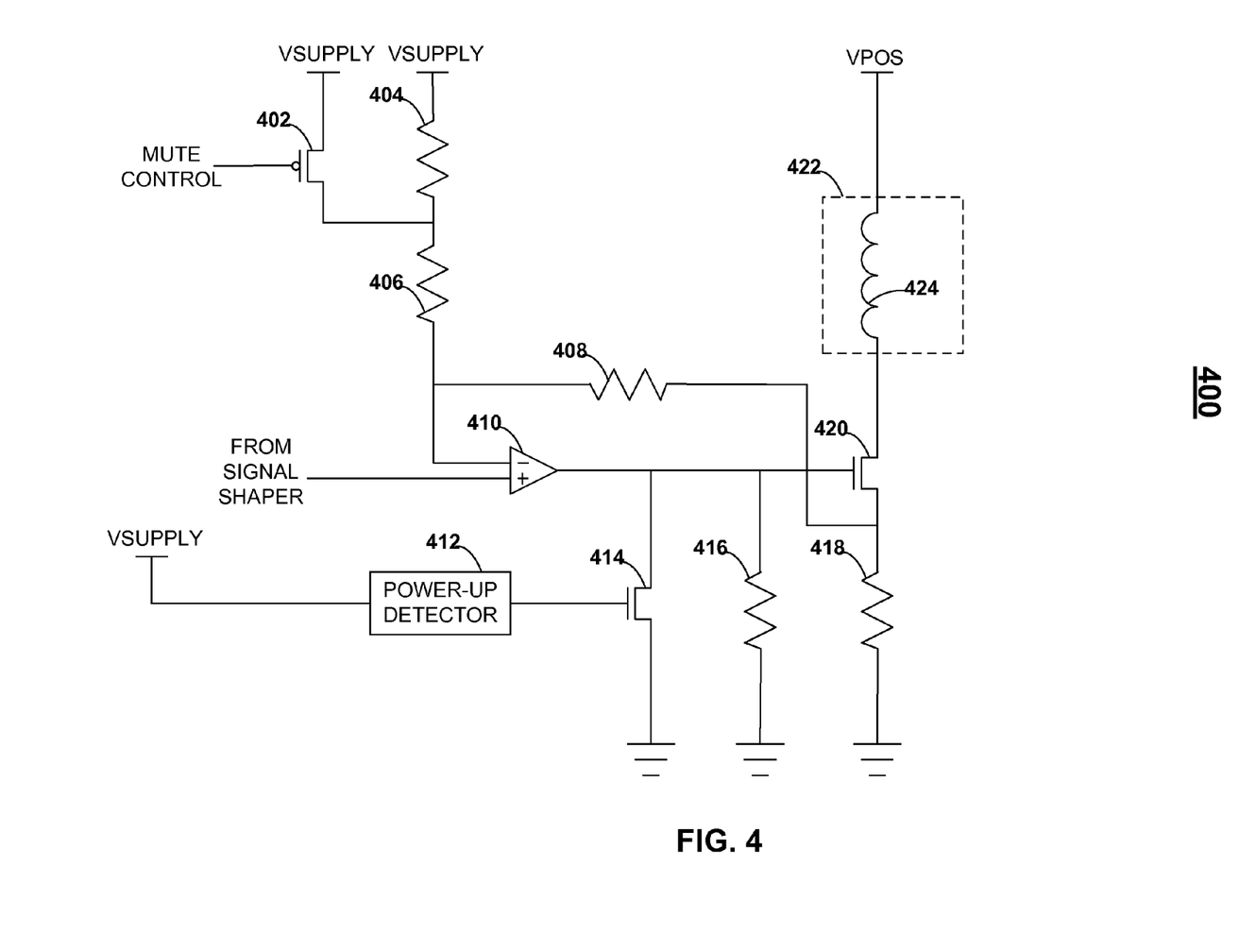
FIG. 4 is an illustration of a spike suppression circuit constructed in accordance with the principles of the present invention.

FIG. 4 shows spike suppression circuit 400 which may include P-FET 402, resistors 404-408, amplifier 410, power-up detector 412, N-FET 414, resistors 416-418, and N-FET 420. Upon power-up, the output of amplifier 410 may tend toward a logic high level. Accordingly, transistor 420 may tend to be conductive at power-up, which may cause an amount of current to be conducted by dynamic magnetic stripe communications device 422 (e.g., coil 424) through resistor 418, which may cause an electromagnetic spike to be sensed by a magnetic stripe reader that may be in communication with dynamic magnetic stripe communications device 422.

Power-up detector 412 may, for example, detect a magnitude of a power supply signal (e.g., VSUPPLY) that is less than, greater than, or equal to a threshold voltage magnitude (e.g., less than a threshold voltage magnitude). Accordingly, for example, power up detector 412 may detect that signal VSUPPLY is between approximately 1.8 to 2.2 volts (e.g., approximately equal to 2 volts) during a power-up event. In so doing, for example, a conductivity state of transistor 414 may be held to a conductive state by power-up detector 412 until power supply signal, VSUPPLY, equals or exceeds a threshold voltage magnitude (e.g., exceeds approximately 2 volts). Until that time, transistor 414 may be held to be conductive, thereby deactivating an output of amplifier 410 (e.g., clamping an output voltage of amplifier 410 to ground potential), until a power supply signal (e.g., VSUPPLY) has achieved an operational magnitude.

Transistor 420 may, for example, exhibit drain to gate parasitic capacitance, which may render transistor 420 conductive during power up (e.g., by increasing a voltage present at the gate terminal of transistor 420 during power up). Accordingly, resistor 416 may be coupled as shown to pull the gate terminal of transistor 420 low during power-up (e.g., to provide a discharge path for the drain to gate parasitic capacitance of transistor 420). A resistance value of resistor 416 may be between approximately 50 kilo ohms and 100 kilo ohms (e.g., 75 kilo ohms).

Resistor 418 may, for example, sense the current being conducted by transistor 420, which is approximately equal to the magnitude of current being conducted by the dynamic magnetic stripe communications device 422 (e.g., coil 424). Accordingly, for example, a voltage indicative of this current may be developed across resistor 418 and fed back to an input of amplifier 410 (e.g., via negative feedback through resistor 408) to control a magnitude of output current based upon this sensed output current and the signal from the signal shaper (e.g., signal shaper 212 of FIG. 2).

Figure 5:
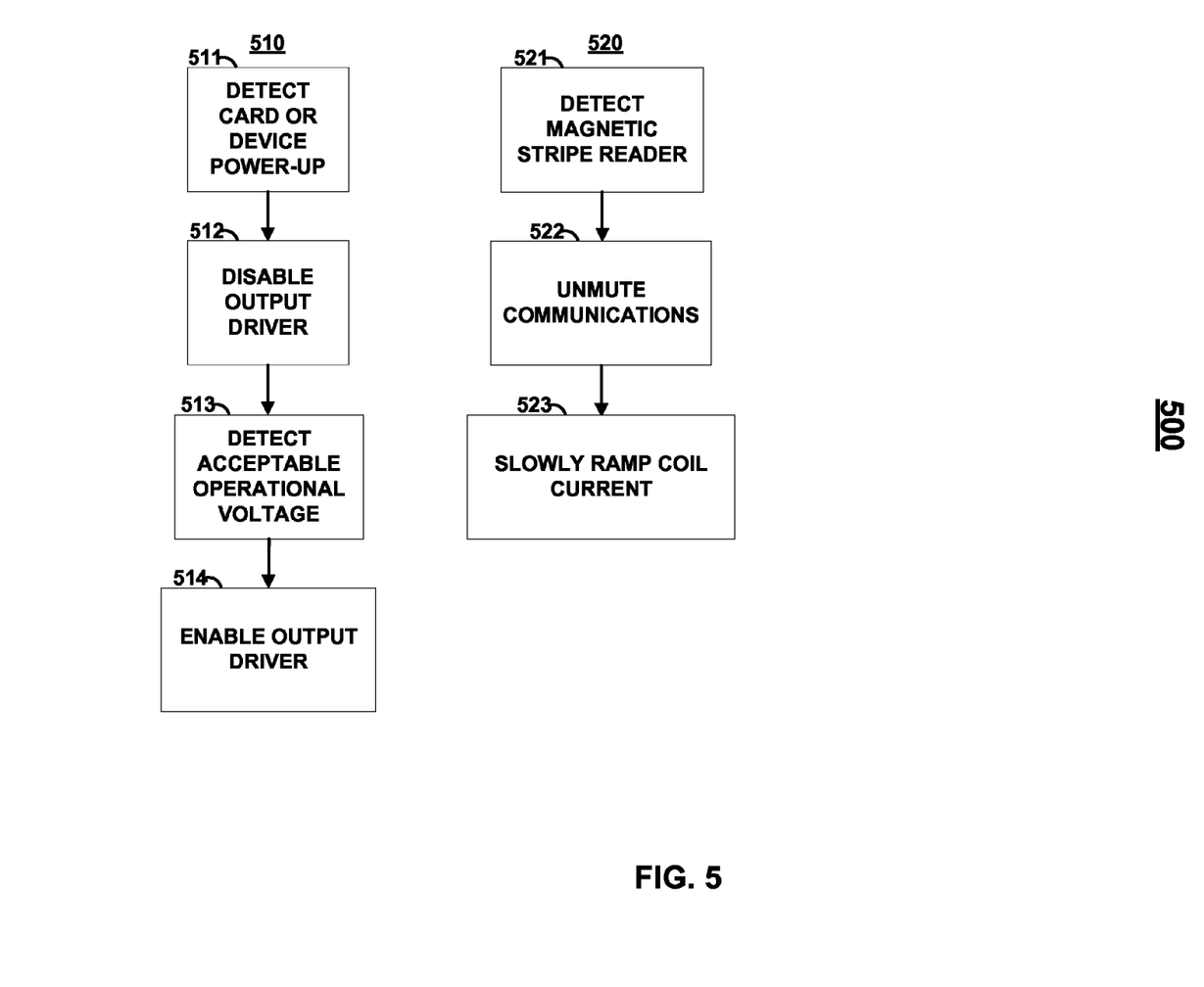
FIG. 5 is an illustration of a process flow constructed in accordance with the principles of the present invention.

A flow diagram of operational sequences is shown in FIG. 5. Step 511 of sequence 510 may, for example, detect that a card or device has been powered up (e.g., a button press on a card or device may cause the card or device to transition from a low-power mode to an operational mode). In step 512, an output driver of the card or device may be disabled during a power-up sequence, so as to provide time for internal bias circuits of the output driver to stabilize.

Accordingly, for example, output glitches from the output driver may be substantially eliminated. In so doing, for example, current spikes into the dynamic magnetic stripe communications device of the card or device may be substantially eliminated, thereby substantially eliminating inadvertent electromagnetic spikes from being received by a magnetic stripe reader that may be in communication with the card or device. Once an acceptable operational voltage level has been achieved within the card or device, the operational voltage may be detected (e.g., as in step 513) and the output driver may then be enabled (e.g., as in step 514).

Step 521 of sequence 520 may, for example, detect a presence of a magnetic stripe reader while a dynamic magnetic stripe communications device of a card or device is muted (e.g., disabled). In step 522, communications from the card or device may be unmuted due, for example, to the detected presence of the magnetic stripe reader. In step 523, a minimum amount of current may be achieved within the dynamic magnetic stripe communications device by slowly ramping the current magnitude from zero to a minimum current magnitude.

Figure 6:
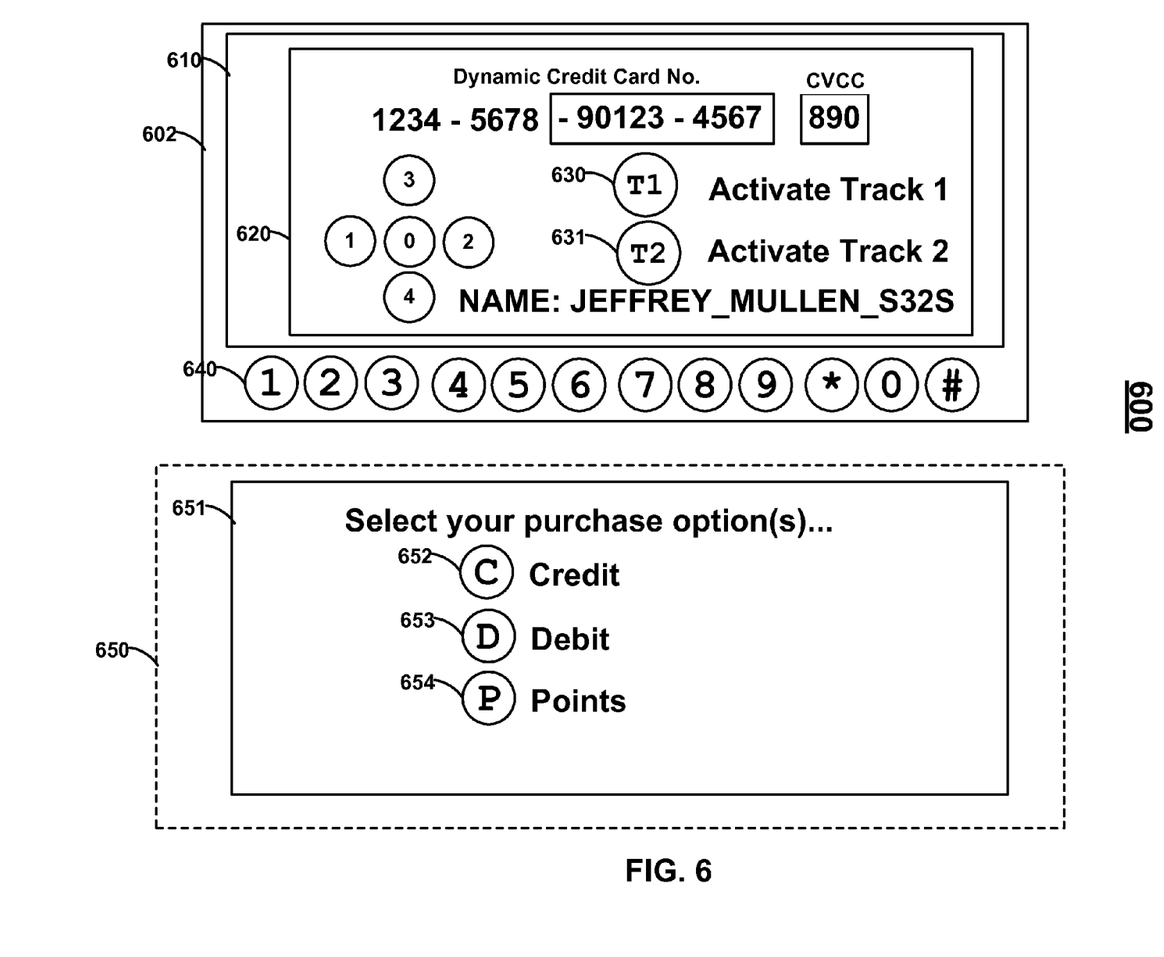
FIG. 6 is an illustration of a mobile device constructed in accordance with the principles of the present invention.

FIG. 6 shows device 600 that may be, for example, a mobile telephonic device such as a mobile cellular phone. Any card provided herein may be provided as a virtual card on device 600. Mechanical buttons 640 may be utilized by a user to make selections (e.g., selections associated with a virtual card). Virtual buttons may be included that a user can activate (e.g., by utilizing a touch-screen displaying a virtual card) so that the user can make selections associated with the virtual card. Device 600 may include, for example, housing 602, display 610, virtual card 620, and virtual buttons 630 and 631. Device 600 may communicate to a card reader via electromagnetic signals (e.g., RF signals) or electromagnetic waveforms. Virtual button 630 may, for example, be pressed to activate a first track of magnetic stripe data for communication. Virtual button 631 may, for example, be pressed to activate first and/or second tracks of magnetic stripe data for communication.

Display configuration 650 may be provided and may be displayed, for example, on a wireless device such as a wireless telephonic device or a wireless payment card. Configuration 650 may include graphical user interface 651 that may include, for example, virtual button 652, virtual button 653, and virtual button 654. A user may be provided with feature selections, such as a credit feature, a debit feature or a points feature, so that such a feature may be selected as a payment method that may be used to complete a purchase transaction. A user may perform a selection by pressing the virtual button associated with the selection. Information associated with the selection may be provided, for example, to a remote server (e.g., via a telephonic data communication) and/or a card (e.g., via light and/or sound pulses). A user may select one or more buttons on a physical or virtual card that are labeled as, for example, a "Credit" button, a "Debit" button, and/or a "Points" button. Information indicative of that selection may then be communicated from the card or device to a card reader (e.g., via an analog waveform) and then provided to a payment server. The payment server may then complete a purchase transaction using the payment information received.

Graphical user interface 651 may, for example, provide an update as to the total reward points that may have been accumulated by an account holder's payment (e.g., credit) account. Accordingly, for example, a user of device 600 may be updated as to the number of reward points that may have accrued. A memory within device 600 may include data associated with the accrued rewards points. Upon selection of virtual button 654 at the point of sale, data associated with the accrued rewards points may be retrieved from memory and converted to an analog waveform. A dynamic magnetic stripe communications device may be activated and the analog waveform may then be communicated to complete a purchase transaction using the rewards points information.

Persons skilled in the art will appreciate that the present invention is not limited to only the embodiments described. Instead, the present invention more generally involves dynamic information and the exchange thereof. Persons skilled in the art will also appreciate that the apparatus of the present invention may be implemented in other ways than those described herein. All such modifications are within the scope of the present invention, which is limited only by the claims that follow.

What is claimed is:

1. A wireless device comprising:
    a dynamic magnetic stripe communications device operable to communicate a waveform encoded with a magnetic stripe data track to complete a purchase transaction; and
    an ASIC including spike suppression circuitry coupled to said dynamic magnetic stripe communications device, said spike suppression circuitry including a power-up detector operable to detect a magnitude of an operational signal of said wireless device,
    wherein said spike suppression circuitry is operable to prohibit data signals from being communicated by said dynamic magnetic stripe communications device until said magnitude of said operational signal is about a threshold value.

2. The wireless device of claim 1, wherein said operational signal is a power supply signal.

3. The wireless device of claim 1, wherein said spike suppression circuitry is operable to prohibit said communication of said data signals during power-up events.

4. The wireless device of claim 1, wherein said ASIC includes a signal generator operable to convert data into at least one drive signal, and to communicate said drive signal to said dynamic magnetic stripe communications device.

5. The wireless device of claim 1, further comprising:
    a memory operable to store data associated with payment account information;
    a plurality of read-head detectors; and
    a processor operable to determine a velocity of read-head movement and a direction of read-head movement based on a plurality of signals from said plurality of read-head detectors,
    wherein said ASIC is operable to receive said velocity and said direction from said processor, to receive said data from said memory, and to generate an analog waveform based on said direction, said velocity and said data.

6. A wireless device comprising:
    a dynamic magnetic stripe communications device operable to communicate a waveform encoded with a magnetic stripe data track as part of a purchase transaction; and
    an ASIC including spike suppression circuitry,
    wherein said spike suppression circuitry is operable to activate at least a portion of said dynamic magnetic stripe communications device during an activation event, and to provide a signal at a rate below a rate producing a spurious communication by said dynamic magnetic stripe communications device after said at least a portion of said dynamic magnetic stripe communications device is activated.

7. The wireless device of claim 6, wherein said signal is a current signal received by said at least a portion of said dynamic magnetic stripe communication device, and
    said signal is increased at said rate.

8. The wireless device of claim 6, wherein said activation event is at least one of a communication channel activation event and a power-up event.

9. The wireless device of claim 6, wherein said activation event is a power-up event, and
    said spike suppression circuitry is operable to activate said at least a portion of said dynamic magnetic stripe communications device upon detecting a power supply voltage is about a threshold voltage.

10. The wireless device of claim 6, further comprising:
    a reader detector,
    wherein said spike suppression circuitry is operable to activate said at least a portion of said dynamic magnetic stripe communications device upon detection of a reader by said reader detector.

11. The wireless device of claim 6, wherein said signal is a current signal, and
    said activation of said at least a portion of said dynamic magnetic stripe communications device includes increasing said current signal for about 40 μsec to about 60 μsec.

12. The wireless device of claim 6, wherein said signal is a current signal, and
    said activation of said at least a portion of said dynamic magnetic stripe communications device includes slowly increasing said current signal to a minimum amplitude.

13. The wireless device of claim 6, wherein said rate is an initial slew rate.

14. The wireless device of claim 6, wherein said spike suppression circuitry is operable to slowly increase a current in said dynamic magnetic stripe communications device.

15. The wireless device of claim 6, wherein said spike suppression circuitry is operable to increase a current in said dynamic magnetic stripe communications device from about 0 mA to about 3 mA within about 30 μsec to about 50 μsec.

16. The wireless device of claim 6, wherein said spurious communication is a communication detectable by a card reader.

17. The wireless device of claim 6, further comprising:
a memory;
a battery;
a virtual button; and
a processor,
wherein said ASIC includes a ramp generator and at least one signal shaping generator.

18. The wireless device of claim 6, wherein said spike suppression circuitry is operable to deactivate said at least a portion of said dynamic magnetic stripe communications device by decreasing a current within said at least a portion of said dynamic magnetic stripe communications device to about 0 mA.

* * * * *